W. F. COOPER & E. P. CHASE.
EXPRESSION MECHANISM FOR PIANOS.
APPLICATION FILED APR. 8, 1910.

1,028,440.

Patented June 4, 1912.

W. F. COOPER & E. P. CHASE.
EXPRESSION MECHANISM FOR PIANOS.
APPLICATION FILED APR. 8, 1910.

1,028,440.

Patented June 4, 1912.

W. F. COOPER & E. P. CHASE.
EXPRESSION MECHANISM FOR PIANOS.
APPLICATION FILED APR. 8, 1910.

1,028,440.

Patented June 4, 1912.

Witnesses
Jo. P. Collins
Chas. P. Seebold

Inventors
W. F. Cooper
E. P. Chase
By H. C. Everts
Attorneys

W. F. COOPER & E. P. CHASE.
EXPRESSION MECHANISM FOR PIANOS.
APPLICATION FILED APR. 8, 1910.

1,028,440.

Patented June 4, 1912.
6 SHEETS—SHEET 6.

Witnesses
Jos. F. Collins
Chas. P. Seebold

Inventors
W. F. Cooper
E. P. Chase
By N. C. Evert
Attorneys

UNITED STATES PATENT OFFICE.

WILLIAM F. COOPER AND EDWARD P. CHASE, OF NORWALK, OHIO; SAID CHASE ASSIGNOR TO THE A. B. CHASE COMPANY.

EXPRESSION MECHANISM FOR PIANOS.

1,028,440.   Specification of Letters Patent.   Patented June 4, 1912.

Application filed April 8, 1910. Serial No. 554,184.

*To all whom it may concern:*

Be it known that we, WILLIAM F. COOPER and EDWARD P. CHASE, citizens of the United States of America, residing at Norwalk, in the county of Huron and State of Ohio, have invented certain new and useful Improvements in Expression Mechanism for Pianos, of which the following is a specification, reference being had therein to the accompanying drawing.

Our invention relates to improvements in expression mechanism for pianos, and has particular relation to mechanism for controlling the movements of the hammer rest rail for the purpose of providing pianissimo and accenting effects.

Among the objects of our invention are to be found the following: 1. To provide a piano having provision for manual or mechanical playing, and which is provided with a usual type of hammer rest rail operating mechanism for manual playing, with mechanism connected with the manual mechanism for controlling the movements of the rail from mechanism forming part of the mechanical playing structure. 2. To control the movements of the hammer rail by manipulation of the pedals which actuate the exhaust receiver. 3. To provide mechanism for controlling movements of the hammer rest rail during mechanical playing by forming an operative connection between the exhaust receiver of the playing mechanism and the mechanism for operating the rail during manual playing. 4. To provide hammer rest rail controlling mechanism operative to normally retain the rail in pianissimo position, and movable under the action of the playing mechanism toward and from its normal position for manual playing, with means for changing such normal position of the rail to provide a correspondence with the requirements for manual playing. 5. To control the pianissimo movements of the hammer rail by the variations in pressures provided during the playing of the piano mechanically. 6. To employ the exhaust receiver of a playing mechanism as the prime controlling element of movements of the hammer rail during mechanical playing. 7. To provide hammer rest rail-movement-controlling mechanism for both manual and mechanical playing, the normal position of the hammer rail being at opposite extremes of its movement dependent upon which method of playing is being employed. 8. To provide hammer rest rail movement-controlling mechanism for manual and mechanical playing, the movements of said mechanism during the mechanical playing being controlled by variations in pressure of the playing mechanism, with means for providing operative disengagement of the connecting mechanism when the piano is to be used for manual playing. 9. To provide pianissimo controlling movements of the hammer rest rail in mechanical playing mechanism by pedal manipulation. 10. To provide an improved and simplified means whereby the operator can secure more pronounced accenting effects in playing mechanically.

Other further objects of the invention are to provide a mechanism which is simple and efficient in operation, durable in construction, and which may be employed in connection with any type of playing mechanism.

To these and other ends, our invention consists in the improved construction and combination of parts hereinafter fully described, illustrated in the accompanying drawings, and particularly pointed out in the appended claims.

In the accompanying drawings, in which similar reference characters indicate similar parts in each of the views, Fig. 7 is a cross-sectional view of a portion of a piano illustrating a modified form of mechanism for providing movement to the hammer rest rail, the actuating device being in the form of an auxiliary pneumatic in permanently open communication with the exhaust receiver, and which is positively connected to the hammer rail, the view showing the hammer rest rail in pianissimo position in dotted lines and in its opposite extreme of movement in full lines.

For the purpose of obtaining expression in the playing of a selection automatically, it is equally as essential to provide mechanism for producing the various effects incident to movements of the hammer rest rail mechanically as is required in playing the selection manually. This fact has been appreciated by player manufacturers and different methods of producing these effects have heretofore been provided, most of such constructions, however, being adapted to be controlled by the hand or fingers of the operator through the use of push buttons, etc., operating to provide movements of a pneumatic which is connected up to an independent hammer rest rail structure, with the result that not only is there a requirement for separate hammer rest rail structures for use in manual and mechanical playing, but in addition there is a requirement of the use of the fingers of one hand to provide the necessary manipulation, thereby eliminating that hand from use in connection with other expression-control mechanisms and placing the operation of each of the latter on but a single hand, resulting in either a too great amount of work required on the one hand or an insufficient expression control.

The present invention differs radically from the type referred to, aiming to make use of the usual hammer rest rail operating devices for manual playing (with the exception of the piano pedal trap rod and the piano pedal), and connecting up with this mechanism a suitable mechanism or instrumentality which has its hammer rest rail controlling movements controlled by the exhaust receiver of the player mechanism, and therefore controlled by the feet of the operator through player pedal manipulation, the pumping action produced by the operator affecting or varying the pressures within the reservoir, and these variations in pressure serving to control the movements of the hammer rest rail operating rod. These results may be obtained in various ways, a number of which are shown in the drawings. For instance, the mechanism for providing movements to the hammer rest rail operating rod may be carried directly by the reservoir, so that the movements of the wall or walls of the reservoir will be communicated directly to said rod—two ways in which this form of mounting may be effected are shown in the drawings; or, the movements of the rod (or the hammer rest rail direct) may be provided by an auxiliary pneumatic which is in permanently-open communication with such reservoir, so that variations in pressure of the reservoir will provide the necessary movements of the auxiliary pneumatic to control movements of the hammer rail—three ways in which this may be effected being illustrated in the drawings and in one of which a spring construction is used in conjunction with such auxiliary pneumatic. Owing to the fact that when the exhaust receiver (which is generally of the type where the pressure is produced by the operation of forming a degree of vacuum therein) is in normal or expanded position caused entirely by the springs within the reservoir (if the latter form is being used), while the operation for exhausting the air within the reservoir is generally being counteracted by the feeding of air through the note sheet perforations and pneumatic valves in the pneumatic mechanism, it will be readily understood that attempts to move the hammer rest rail toward its pianissimo position by pedal movements which aim to exhaust the reservoir, would be impracticable since the pianissimo position of the hammer rail could only be maintained by pedaling at a sufficiently high rate to retain the reservoir at a maximum exhaust pressure. Since pianissimo passages are generally of such a character as would correspond to a decreased feeding of air from the action of the sound producing devices to the bellows, it will be readily understood that it would be difficult to produce any uniformity in the pianissimo position of the hammer rest rail if it be attempted to cause the movement of the latter toward such position by increasing the exhaust pressure within the reservoir. For this and other reasons we have reversed this operation, placing the hammer rest rail in pianissimo position when the reservoir is at its lowest exhaust pressure (or expanded), thereby making this position the normal position for the hammer rest rail while the mechanical playing is taking place. The movement of the hammer rest rail to its seat on the hammer rail rest is caused by increasing the exhaust pressure in the reservoir, as well as by the tendency of the springs of the hammers to return the rail to its position of rest; in other words, the normal position of the rail when under mechanical playing control is the pianissimo position, and by regulating the resistance afforded by the springs (or other device used for the purpose), the hammer rest rail may be moved to its opposite extreme (in contact with the rest) prior to a complete collapsing of the reservoir. In use, we have found that by a proper form of leverage, a movement of the reservoir between its fully expanded and approximately one-half collapse is sufficient for providing the extreme length of movement to the hammer rest rail, any additional increase of pressure within the reservoir not affecting the position of the hammer rest rail, so that the operator may be certain that he cannot affect this mechanism by excessive pedaling or under the requirements of a high exhaust pressure. As the normal position of the hammer rest rail is placed in pianissimo position, it would remain in that position while the playing mechanism is not being used, with the result that manual manipulation of the piano in this respect could not be had. To remedy this we have provided mechanism by means of which the hammer rest rail may be lowered to its normal position for manual operation (rendering the mechanical structure inactive with respect to the hammer rest rail) and thereby permit the use of the soft or pianissimo pedal for manual playing. When it is again desired to operate the piano mechanically, the former connection is again made and places the hammer rest rail in its pianissimo position ready for operation.

From the above it will be readily understood that the main feature of the invention is to provide a practical way or ways by means of which variations in pressure of the pressure reservoir may be employed to control the movements of the hammer rest rail. We have, herein, disclosed a number of ways in which this result can be obtained, and we will now describe them and their operations.

Figure 1:
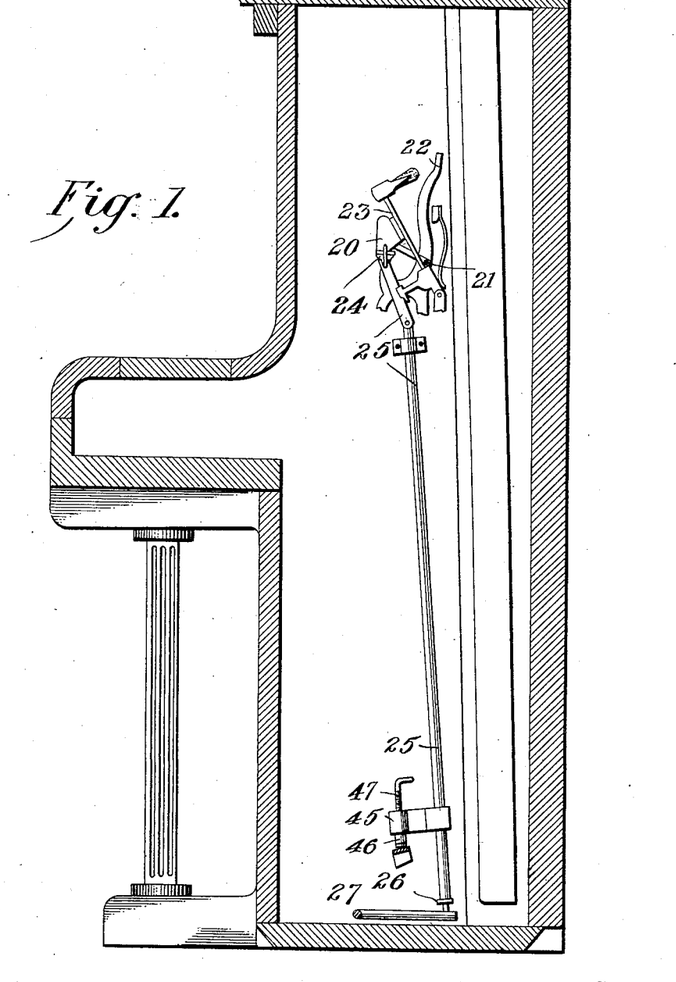
—Figure 1 is a vertical cross-sectional view of so much of a piano case and action as will indicate the manner in which the hammer rest rail is moved to control the pianissimo effects, said figure indicating one way in which the mechanism may be connected to provide for either manual or mechanical control of the movements of the hammer rest rail.

The preferred form in which we employ this invention is that disclosed in Figs. 1 to 4 inclusive, Fig. 1 illustrating mainly the usual arrangement of hammer rest rail and its operating mechanism for manual manipulation, and showing the connecting portion in position. In said Fig. 1 the hammer rest rail is indicated at 20, being pivoted at 21 to the frame work 22; 23 designates the hammer, 24 the hammer rest rail rest, 25 the hammer rest rail operating rod having the button 26 at its lower end which is adapted to normally seat within a proper recess formed in the pedal trap rod 27, these parts, in connection with the piano pedal forming the operating mechanism for the hammer rest rail during manual manipulation, the operation being well known, the rod 25 being raised by a depression of the pedal, this raising of the rod moving the hammer rest rail to pianissimo position, the movement of the rod in the opposite direction permitting the hammer rest rail to return to its seat on the rest 24. These parts are of any preferred type, and are employed in connection with each of the forms of mechanically controlling devices shown in the drawings.

Figure 2:
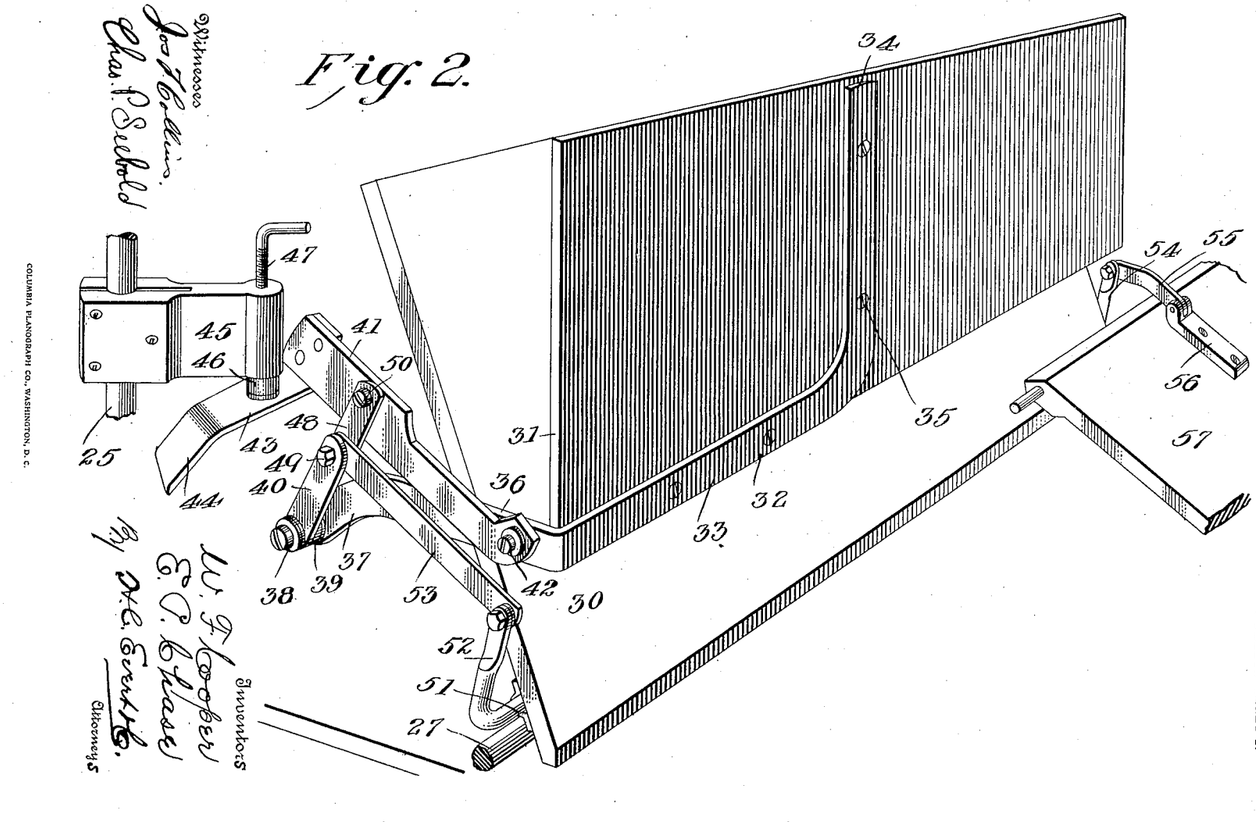
Fig. 2 is a perspective view of so much of the interior of the well-known type of playing mechanism as is necessary to disclose one form in which our invention may be applied to the playing mechanism of the piano.
Figure 3:
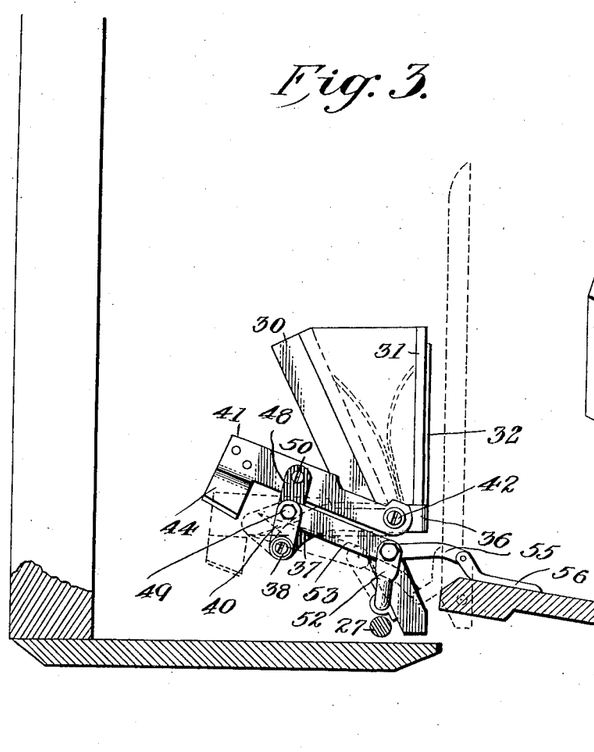
Fig. 3 is a cross-sectional view taken through parts of the piano to show our improved mechanism applied in position, said mechanism being shown in end elevation, said view disclosing one way in which the operating mechanism between the exhaust receiver and the hammer rest rail operating rod may be moved from operative to inoperative position, the parts being shown in operative position in full lines and in inoperative position in dotted lines, the mechanism in this case having a positive connection with the pedal door.
Figure 4:
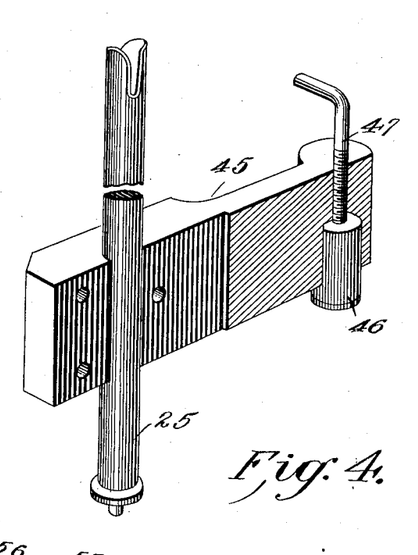
Fig. 4 is a perspective sectional view of the connecting member which is permanently carried by the hammer rest rail operating rod.

Mechanical players of the pneumatic type are each provided with a pressure reservoir with which the pumping bellows or mechanism as well as the operating mechanism for the sound producing parts, as the various pneumatics, etc., are in communication, this reservoir being generally in the form of a bellows one board of which is movable under the opposing forces of atmospheric pressure caused by the exhaust pumps and the expanding springs of the bellows aided by the feeding of air from the action to the bellows. One type of such reservoir is indicated in detail in Fig. 2 of the drawings in which 30 designates the stationary wall or board of the reservoir and 31 the movable wall or board, the latter being hinged at its lower end so that increase of exhaust pressure within the reservoir will tend to cause the upper end of the wall or board 31 to move toward the similar end of the wall or board 30, while a decrease of exhaust pressure will cause said upper ends of the boards to separate under the action of the spring or springs (or other equivalents) contained within the reservoir. It will be understood that this reservoir is connected up with a pumping mechanism and also with the pneumatic mechanism or action of the player as is usual. It is these movements of the movable board 31 which are employed to control the movements of the hammer rest rail. The preferred form of connecting the board 31 with the rod 25 is illustrated in Figs. 2, 3 and 4 in which 32 designates a lever preferably shaped as indicated in Fig. 2, said lever having an intermediate portion 33 secured to the lower end of the board 31 and having one end of the lever, designated as 34 extending at right angles to the direction of length of the portion 33, this portion 34 extending vertically of the face of the board, these portions being secured to said board by suitable means such as screws 35. The other end of the lever 32 is bent rearwardly at approximately right angles to the plane of the portion 33, said rearwardly-extending portion, indicated as 36, extending rearwardly along one end of the reservoir, the rear end of the portion 36 being preferably bent downwardly as at 37 and provided with a pin 38 on which is mounted a collar 39 of suitable noise-deadening material, such as wood or rubber, etc., and on which is pivotally-mounted a link 40 presently referred to. Adjacent the rearward bend of the lever 32, and at a point which may be in alinement with the pivot line of the wall 31, an arm 41 is pivotally-mounted on a pin 42, said arm 41 extending rearwardly a suitable distance and having at its rear end a laterally-extending portion 43 which may, if desired, be bent downwardly at an inclination as indicated at 44, for a purpose presently described. Secured on the hammer rail operating rod 25 is a block or connecting member 45, preferably formed as indicated in Fig. 4, being provided with a kerfed rear end to permit of adjustable clamping thereof lengthwise of the rod 25, and having its forward end provided with a button 46 carried by a screw-threaded member 47, said member 47 serving to project and retract the button 46 to a greater or less extent for the purpose of accurately adjusting the throw of the hammer rest rail as presently described. As will be readily seen by referring to Figs. 2 and 3, the arm 41 will rest on the member 39 if not supported in a manner which will carry the rear end of said arm upwardly out of contact with said member. To provide for such support in its upward position, we employ the toggle device shown in Fig. 2 in which the link 40 forms one member and a link 48 connected at one end to link 40 by a pivot 49 and at its other end to the arm 41 by a pivot 50, forms the other member, the structure being such that when said links are in alinement, the arm 41 will be raised to its greatest extent, thereby raising the block 45, the button 46 of which will be in contact with the portion 43, and with it the hammer rail to pianissimo position. When in this position, the construction is such that the arm 41 becomes practically an integral structure with the lever 32, with the result that movements of the board 31 will cause said arm 41 to move on a vertical arc on pivot 42, thereby raising the hammer rest rail or permitting it to be lowered according to the direction of movement of the board 31, it being obvious that the downward movement of the operating rod 25 will be limited by contact of the hammer rest rail with its rest 24, but this will not affect a further collapsing movement of the reservoir since the button 46 has no positive connection with the portion 43 of the arm 41, such excessive movement of the board simply causing the portion 43 to pass out of contact with the button 46. From this it will be readily understood that an adjustment of the threaded member 47 will serve to regulate the pianissimo position of the hammer rest rail for mechanical playing, a greater or less projection of the button from the block 45 producing a greater or less movement of the rod 25 in its hammer rest rail raising movement. And as block 45 is adjustably-mounted on the rod 25, it will be readily understood that the greatest accuracy may be had in providing the necessary adjustment to these parts. As heretofore pointed out, the normal position (the position shown in Fig. 2 and in full lines in Fig. 3) of the mechanism is such that when the reservoir is expanded or has its lowest pressure, the hammer rest rail is in its pianissimo position. To change this normal position for the purpose, for instance, of permitting a manual manipulation, we permit the operating rod 25 to resume its normal position in contact with the pedal trap rod 27, this lowering movement being provided by breaking the alinement of the links 40 and 48, permitting the arm 41 to assume a position in contact with the member 39, as shown in dotted lines in Fig. 3, the length of this movement being sufficient to carry the portion 43 entirely out of contact with the lower face and out of the range of movement of the button 46. A preferred form of construction for breaking this alinement is indicated in Fig. 2 in which a crank rod 51 is secured on the rear side of the board 30, and has its opposite ends bent at an angle to the direction of length of the rod, the free end of one of said bent ends, indicated at 52 being pivotally-connected, by means of a link 53 with the pivot point 49 of the links 40 and 48, the opposite end of the rod 51, designated as 54, being pivotally-connected by a link 55 to a securing member 56 carried by the pedal door 57, the latter being pivotally-mounted as is usual, the pivotal connection of member 56 with link 55 being out of alinement with the pivot pin of the door 57. By this form of mounting, it will be readily understood that when the door 57 is in the position which it assumes when mechanical playing is taking place, the links 40 and 48 will be held in alinement, so that the portion 43 of arm 41 is in operative position to effect the lifting of the hammer rest rail, and that when the door 57 is moved upwardly to close the front of the piano, as indicated in dotted lines in Fig. 3, the rod 51 will be rocked in such manner as to break the alinement of the links 40 and 48 and permit the arm 41 to pass downwardly into contact with member 39, as indicated in dotted lines in Fig. 3, this closing of the door effecting the engagement of rod 25 with the pedal trap rod 27 of the soft or pianissimo pedal of the piano ready for operation in manual playing. This form of connecting and disconnecting the mechanisms is automatically produced by movements of the pedal door. As will be seen by referring to Fig. 2, the button 46, when the parts are in operative position for mechanically playing contacts with the portion 43 of arm 41. As shown in said figure said arm also has the downwardly-inclined portion 44, and this is provided in order that where the mechanism is connected up with player mechanism hingedly mounted within the piano case, as in the piano player shown in Patent #833,206, granted to W. F. Cooper, October 9, 1906, in which the entire inner mechanism with the exception of the member 45 would be bodily moved pivotally out of position, when the player mechanism is moved outward from the case, its return to position within the case will cause the button 46 to contact with the portion 44 so that as the player mechanism is gradually closed, the hammer rest rail will be moved to its normal mechanical playing pianissimo position, the position indicated in Fig. 2.

Figure 5:
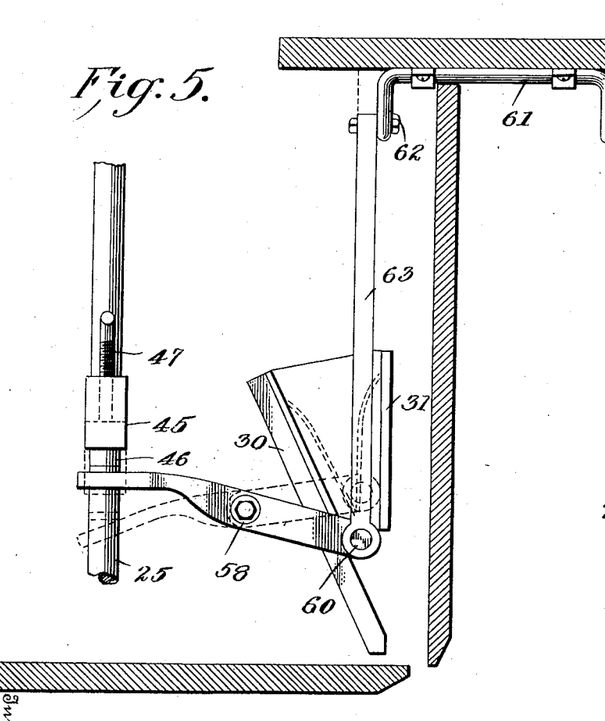
Fig. 5 is a cross-sectional view taken through parts of a piano and showing a modified form of mechanism for connecting the exhaust receiver with the hammer rest rail operating rod and a modified form of means for placing this mechanism into and out of operative position.
Figure 6:
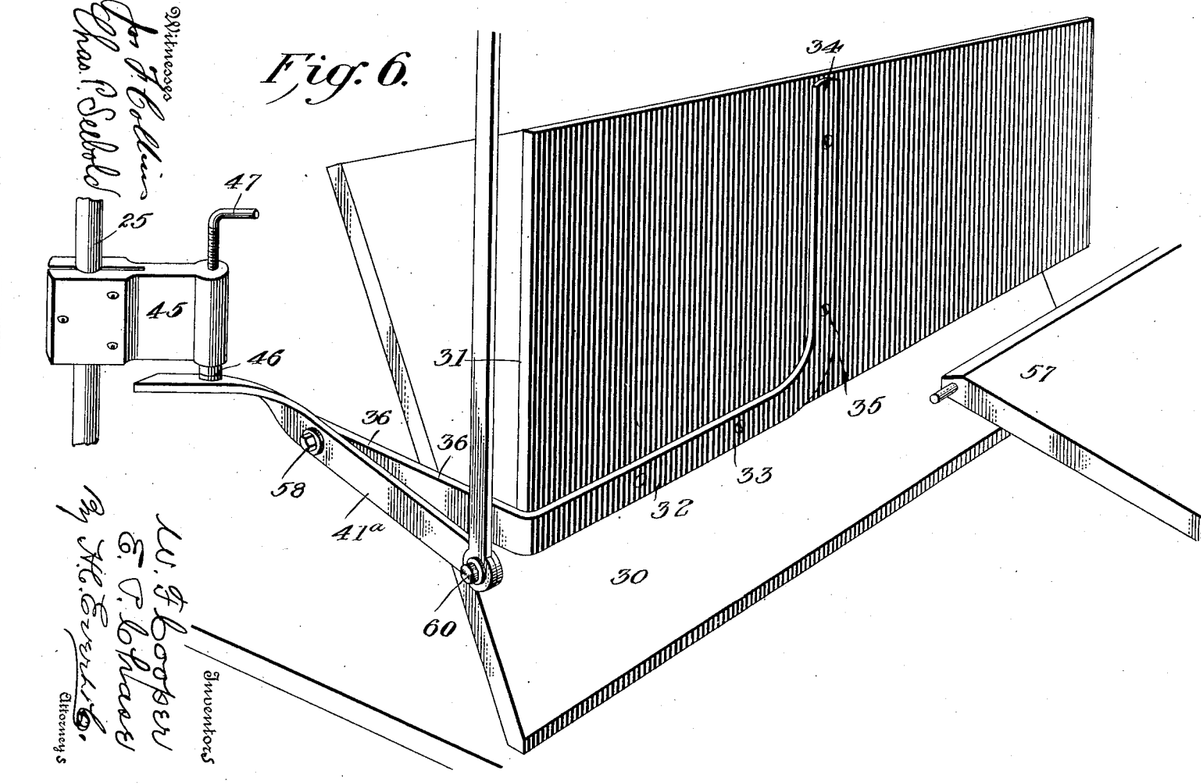
Fig. 6 is a perspective view similar to Fig. 2 and showing the operating mechanism disclosed in Fig. 5.

The construction shown in Figs. 5 and 6 differs from that above referred to in that instead of causing the change in position of the operating arm 41 by connection with the pedal door, the movement of this arm into and out of operative position is provided by hand, thereby simplifying to some extent the structural elements, since it is possible to mount the operating lever at one end of the key bed of the piano. In this construction the toggle device is eliminated and the arm 41 is differently mounted, this arm, indicated as 41ª being pivotally-connected to the part 36 at a point 58 in rear of the board 30, the portion 36 being simply straight instead of curved. The forward end of the arm 41ª is of a length to permit of the location of a pivot point 60 which, during pivotal movements of said arm 41ª on pivot 58 would have a path of movement on an arc intersecting the line extending coincident with the line of hinged connection of board 31, so that said arm 41ª may be placed in a position where its pivot point 60 will be in alinement with the hinge line of board 31, this particular point being that at which said arm 41ª places the hammer rest rail in its pianissimo position, the rear end of arm 41ª being formed substantially similar to that of arm 41, with portions 43 and 44, and the block connection 45 being the same as in the previously described form. To place and retain the arm 41ª in this position, we provide a crank lever 61 pivotally-secured to the under side of the key bed and which has its rear cranked end 62 connected to the pivot 60 of arm 41ª by a link member 63, the parts being arranged in such manner that when the lever 61 is turned downwardly, as indicated in Fig. 5, the arm 41ª will have its pivot 60 in direct alinement with the hinge of the board 31, so that movements of the said board 31 will cause the rear end of the arm 41ª to have proper movements, the pivot point 60 being the fulcrum on which said arm 41ª operates. When it is desired to throw the arm 41ª out of operation, it is necessary only to move the lever 61 so as to raise the forward end of arm 41ª with the result that its rear end will pass to an inactive position. By simply rotating the lever 61 to the position shown in Fig. 5, the parts will again be returned to a position where the arm 41ª is active with respect to the hammer rest rail.

In each of the before described structures the actuating mechanism is connected directly to the board 31 of the reservoir.
While this manner of providing the operative mechanism is a preferred one, we do not limit ourselves to this particular type, as the same idea of employing the variations in pressure of the reservoir may be used in a different manner, and various forms for such changes will now be described. In Fig. 7 we have shown one way in which this general idea may be employed by the use of an auxiliary pneumatic, designated as 70, this pneumatic being connected to the main pressure reservoir by a connection 71, the pneumatic 70 having a spring 72 or its equivalent for normally expanding it when the exhausting action of the reservoir is dormant. In this form, the pneumatic 70 is connected directly to the hammer rest rail by means of a link 73, the collapsed position of the pneumatic permitting the hammer rest rail to be seated on its rest 24 while the expanded position of the pneumatic will place said hammer rest rail in pianissimo position. In this form the hammer rest rail operating rod is not provided with the connecting member 45. To enable the hammer rest rail to assume its normal position for manual playing, any preferred mechanism for placing the pneumatic 70 in collapsed position without affecting the condition of the reservoir, may be employed. For instance, the hinged board of the pneumatic 70 may be provided with an arm 74 having a loose connection with a rod 75 provided with a nut 76, said rod 75 being operatively connected either to the pedal door or other movable portion of the piano casing or to a hand lever which will serve, when the pneumatic is to be collapsed, to raise the free end of the arm 74 and thereby collapse the pneumatic, an opposite movement of the rod 75 permitting the pneumatic to expand and place the hammer rest rail in pianissimo position. As will be obvious, when the reservoir has its least exhaust pressure, the pneumatic 70 will be in its expanded position, the increase of exhaust pressure in the reservoir necessarily acting to exhaust from the pneumatic 70 and thereby producing the same movement to the hammer rest rail as heretofore set forth.

Figure 8:
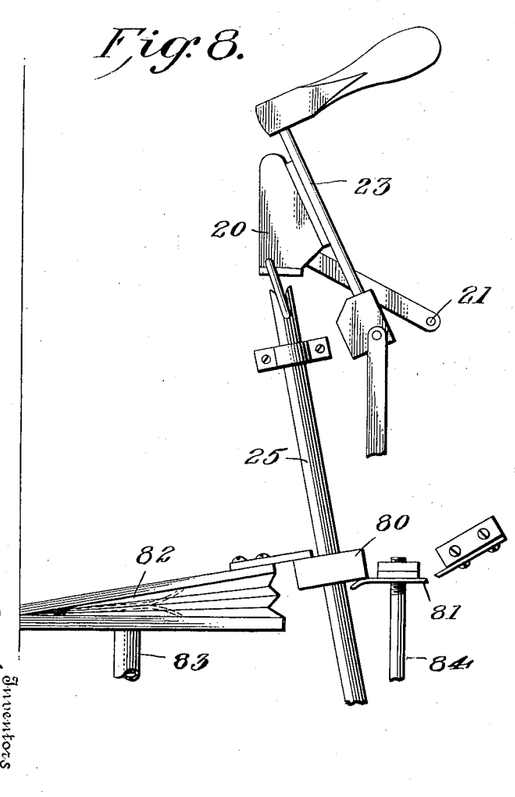
Fig. 8 is a diagrammatic view illustrating a further modified form for controlling the movements of the hammer rest rail, the rail being normally held in pianissimo-producing position by a spring or springs, the auxiliary pneumatic being employed to control the movements of the rail toward its position on the hammer rest rail rest.

In the type of mechanism set forth in Fig. 8, the operating rod 25 is provided with a member 80 against the under side of which a spring 81, diagrammatically indicated as a leaf spring and attached to the case, is adapted to contact, said spring tending to raise said rod to move the hammer rest rail to pianissimo position. In this case the auxiliary pneumatic, indicated as 82 is arranged so that its collapsing movement is in opposition to the action of spring 81, thereby causing the hammer rest rail to be drawn away from the pianissimo position as the exhaust pressure in the reservoir increases, the auxiliary pneumatic being connected to the reservoir by connection 83. In this form, the spring may be acted upon to take it out of a position where it will raise the rod 25, when the hammer rest rail is intended to be moved to position for manual playing. One form of such device is indicated at 84 in Fig. 8, but it will be readily understood that, if desired, or if a different type of spring is employed, the holder for the spring might be given a movement which would take the spring out of operative position.

Figure 9:
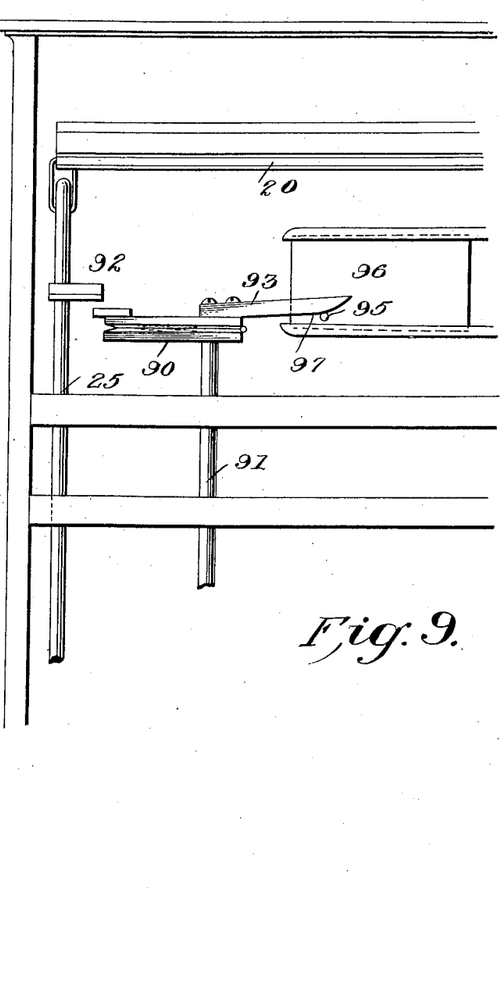
Fig. 9 is a diagrammatic view of a still further modification which may be employed, the auxiliary pneumatic in this case operating to normally position the hammer rest rail in its pianissimo-producing position, and illustrating a modified way in which the auxiliary pneumatic may be moved mechanically by the opening and closing of a tracker box door to place said pneumatic into and out of operative position.

A still further modification is disclosed in Fig. 9, in which the rod 25 is normally moved to pianissimo position by the auxiliary pneumatic 90, the latter being connected to the reservoir by a connection 91, said pneumatic being adapted to coöperate with a button or projection 92 on the rod 25 to cause the movements of said rod. As shown in said Fig. 9, the movable board of the pneumatic 90 is provided with an arm 93 which extends into the path of movement of a pin 95 carried by the tracker box cover 96 of the piano, this particular type being adapted for use where the tracker box is located at the top of the case. As will be readily understood, the movement of the door or cover 96 to its closed position, will cause the pin 95 to ride beneath the cam surface 97 of arm 93, causing said arm to be given a movement which will collapse the pneumatic 90 and allow the hammer rest rail to assume its position on the rest 24 while the opening of the door 96 will remove said pin from contact with said face 97 and permit the pneumatic to expand and move the hammer rest rail to its pianissimo position as in the other cases.

A still further exemplification of the principles of this invention would be its application to an organ, either automatic or mechanical, by providing suitable connections between the reservoir, and suitable swells or stops for modifying the volume of tone. These connections would be made practically in the same manner shown as in the drawings, the bellows and the swells operating concurrently with one another. These connections could be made either directly with the bellows or through the medium of a separate power pneumatic or bellows, connected by a channel with the main reservoir, so that the variations in pressure would operate to raise the swells or stops, and increase and decrease the volume of tone concurrently with the increase and decrease in pressure in the reservoir. The closing of the bellows or pneumatics would operate to open the swells or stops, and vice versa.

A further modification, without departing from the spirit of this invention, would be to divide the hammer rail into two or more sections of a varying compass of notes, and to provide a corresponding number of bellows or pneumatics to operate upon these rails as described. These also could be made to operate at varying degrees of pressure to produce different degrees of shading of the tones to the different sections of the instrument.

What we claim is:

1. In a pneumatic piano, a movable hammer rest rail and its operating rod, a tension bellows, and connections between the bellows and rod to cause movement of the latter by movements of the former, said connections being movable to place them into and out of an operative position, said connections in operative position acting as an arm or extension of and movable with the movable board of the bellows with said arm extending angularly with respect to the plane of the face of said board, the board and extension operating as a unitary structure when in operative relationship, and means for moving the connections into and out of operative position changing the angularity of the extension relative to the board.

2. In a pneumatic piano, a movable hammer rest rail and its operating rod, a tension bellows, and connections between the bellows and rod to cause movement of the latter by movements of the former, said connections being movable to place them into and out of an operative position, said connections in operative position acting as an arm or extension of and movable with the movable board of the bellows with said arm extending angularly with respect to the plane of the face of said board, and means for moving the connections into and out of the operative position, the movement of said connections out of operative position changing the angularity of the extension relative to the board and breaking the operative relation between the bellows and rod.

3. In a pneumatic piano, a movable hammer rest rail and its operating rod, a tension bellows, and connections between the bellows and rod to cause movement of the latter by movements of the former, said connections being movable to place them into and out of an operative position, said connections in operative position acting as an arm or extension of and movable with the movable board of the bellows with said arm extending angularly with respect to the plane of the face of said board, and means for moving the connections into and out of the operative position, said means retaining the connections in either position and changing the angularity of the extension relative to the board.

4. In a pneumatic piano, a movable hammer rest rail and its operating rod, a tension bellows, and connections between the bellows and rod to cause movement of the latter by movements of the former, said connections being movable to place them into and out of an operative position, said connections in operative position acting as an arm or extension of and movable with the movable board of the bellows with said arm extending angularly with respect to the plane of the face of said board, a pedal door and means for moving the connections into and out of the operative position, said means being controlled by the movements of the treadle door.

5. In a pneumatic piano, a casing having an opening, a hammer rest rail, a tension bellows, means for causing movements of the hammer rest rail by movements of the movable board of the tension bellows, said means being movable to break the operative relationship between the rail and bellows, and a movable element carried by and adapted to form a closure for an opening in the casing of the piano, said element effecting a movement of said means into and out of operative position by its movements into and out of closure position, said means being in operative position when the element is in non-closure position.

6. In a pneumatic piano, a movable hammer rest rail and its operating rod, a tension bellows, and connections between the bellows and the rod to cause movements of the latter by movements of the former, said connections comprising a pivoted arm carried by the bellows and movable angularly with respect to the bellows into and out of an operative position with respect to the rod, said arm in operative position extending angularly with respect to the plane of the face of the movable board of the bellows.

7. In a pneumatic piano, a movable hammer rest rail and its operating rod, a tension bellows, and connections between the bellows and the rod to cause movements of the latter by movements of the former, said connections comprising a pivoted arm carried by the bellows and movable angularly with respect to the bellows into and out of an operative position with respect to the rod, said arm in operative position extending angularly with respect to the plane of the face of the movable board of the bellows, and means for moving said arm on its pivot.

8. In a pneumatic piano, a movable hammer rest rail and its operating rod, a tension bellows, and connections between the bellows and the rod to cause movements of the latter by movements of the former, said connections comprising a pivoted arm carried by the bellows and movable angularly with respect to the bellows into and out of an operative position with respect to the rod, said arm in operative position extending angularly with respect to the plane of the face of the movable board of the bellows, and means for moving said arm into and out of its operative position and for retaining it in either position.

9. In a pneumatic piano, a movable hammer rest rail and its operating rod, a tension bellows, and connections between the bellows and the rod to cause movements of the latter by movements of the former, said connections comprising a pivoted arm carried by the bellows and movable angularly with respect to the bellows into and out of an operative position with respect to the rod, said arm in operative position extending angularly with respect to the plane of the face of the movable board of the bellows, the active pivot of said arm in operative position, being axially alined with the pivotal axis of said movable board.

10. In a pneumatic piano, a movable hammer rest rail and its operating rod, a tension bellows, and connections between the bellows and rod to cause movements of the latter by movements of the former, said connections comprising a pivoted arm carried by the bellows and movable angularly with respect to the bellows into and out of operative position with respect to the rod.

11. In a pneumatic piano, a movable hammer rest rail and its operating rod, a tension bellows, and connections between the bellows and rod to cause movements of the latter by movements of the former, said connections comprising a pivoted arm carried by the bellows and movable angularly with respect to the bellows into and out of operative position with respect to the rod, and means for moving said arm on its pivot.

12. In a pneumatic piano, a movable hammer rest rail and its operating rod, a tension bellows, and connections between the bellows and rod to cause movements of the latter by movements of the former, said connections comprising a pivoted arm carried by the bellows and movable angularly with respect to the bellows into and out of operative position with respect to the rod, and means for moving said arm into and out of its operative position and for retaining it in either position.

13. In a pneumatic piano, a movable hammer rest rail and its operating rod, a tension bellows, and connections between the bellows and rod to cause movements of the latter by movements of the former, said connections comprising a pivoted arm carried by the bellows and movable angularly with respect to the bellows into and out of operative position with respect to the rod, the active pivot of said arm in operative position being axially alined with the pivotal axis of said movable board.

14. In a pneumatic piano, a movable hammer rest rail and its operating rod, a tension bellows, and connections between the bellows and rod to cause movements of the latter by movements of the former, said connections comprising a pivoted arm carried by the bellows and movable into and out of operative position with respect to the rod, and means independent of the bellows board for moving said arm on its pivot to break the operative connection between the bellows and rod.

15. In a pneumatic piano, a movable hammer rest rail, and its operating rod, a tension bellows, and make and break connections between the bellows and rod to cause movements of the latter by movements of the former at will, said connections including a member carried by and adjustable in the direction of length of the rod, said member being free from positive connection with the bellows.

16. In a pneumatic piano, a movable hammer rest rail and its operating rod, a tension bellows, and make and break connections between the bellows and rod to cause movements of the latter by movements of the former at will, said connections including a clamp member carried by the rod, and an element adjustable in the clamp member, said member being operative only when the rod movements are controlled by the bellows and being free from positive connection with the tension bellows.

17. In a pneumatic piano, a movable hammer rest rail and its operating rod, a tension bellows, and connections between the bellows and rod to cause movements of the latter by movements of the former, said connections comprising a pivoted arm carried by the bellows and movable angularly with respect to the bellows into and out of operative position with respect to the rod, a member carried by and movable with said rod, said member having an element adjustable in the direction of length of the rod and positioned in the path of movement of the arm.

18. In a pneumatic piano, a movable hammer rest rail and its operating rod, a tension bellows, and connections between the bellows and rod to cause movements of the latter by movements of the former, said connections comprising a pivoted arm carried by the bellows and movable into and out of operative position with respect to the rod, and a toggle device for moving said arm into and out of its operative position.

19. In a pneumatic piano, a movable hammer rest rail and its operating rod, a tension bellows, and connections between the bellows and rod to cause movements of the latter by movements of the former, said connections comprising a pivoted arm carried by the bellows and movable into and out of operative position with respect to the rod, and a toggle device for moving said arm into and out of its operative position, said device supporting the arm in operative position.

20. In a pneumatic piano, a movable hammer rest rail and its operating rod, a pedal door, a tension bellows, and connections between the bellows and rod to cause movements of the latter by movements of the former, said connections comprising a pivoted arm carried by the bellows and movable into and out of operative position with respect to the rod, a toggle device for moving said arm into and out of its operative position, said device supporting the arm in operative position, and means operated by the pedal door for moving said toggle.

In testimony whereof we affix our signatures in the presence of two witnesses.

WILLIAM F. COOPER.
EDWARD P. CHASE.

Witnesses:
JOHN M. BECHTOL,
H. P. MOORE.

---

Copies of this patent may be obtained for five cents each, by addressing the "Commissioner of Patents, Washington, D. C."